INVENTOR.
HARRY W. CROMIE

April 28, 1970 H. W. CROMIE 3,508,281
FABRIC COVERED HEART VALVE HAVING AN IMPROVED FABRIC SEAT
Filed Feb. 8, 1968 4 Sheets-Sheet 2

INVENTOR.
HARRY W. CROMIE
BY
Brown, Critchlow, Flick & Peckham
ATTORNEYS.

April 28, 1970     H. W. CROMIE     3,508,281
FABRIC COVERED HEART VALVE HAVING AN IMPROVED FABRIC SEAT
Filed Feb. 8, 1968     4 Sheets-Sheet 3

INVENTOR.
HARRY W. CROMIE
BY
Brown, Critchlow, Flick & Peckham
ATTORNEYS.

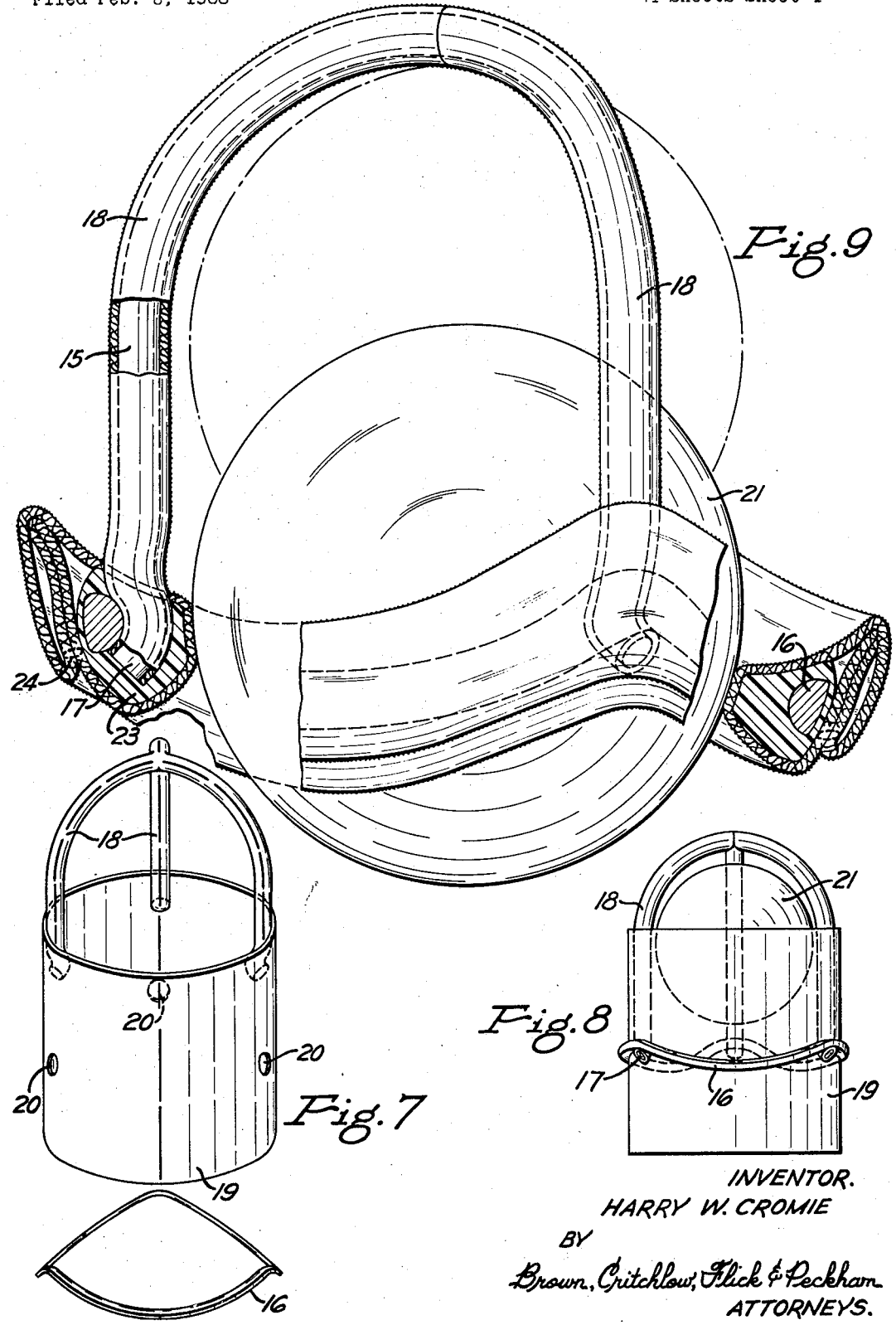

United States Patent Office 3,508,281
Patented Apr. 28, 1970

3,508,281
FABRIC COVERED HEART VALVE HAVING AN IMPROVED FABRIC SEAT
Harry W. Cromie, Mount Lebanon, Pa.
(529 Greenhurst Drive, Pittsburgh, Pa. 15216)
Filed Feb. 8, 1968, Ser. No. 704,006
Int. Cl. A61f 1/22
U.S. Cl. 3—1                                                      11 Claims

ABSTRACT OF THE DISCLOSURE

A metal ring, having struts extending away from one end of it to form a cage, forms a blood passage. The ring is enclosed in a fabric cover that forms a valve seat, between which and the inner surface of the metal ring there is a layer of plastic material that bonds the cover to the ring. A movable ball is loosely disposed in the cage for engaging the valve seat to close the valve.

---

It is among the objects of this invetnion to provide a prosthetic heart valve which has no stationary metal parts exposed to blood, which has a light weight valve ball that will give no trouble, which has a durable valve seat, which has a large passage through it when open, and which is shaped to conform to the shape of the site of attachment in the heart.

In accordance with this invention, a metal ring forming a blood passage has at least three struts connected to it and extending away from one end to form a cage for a hollow metal ball. An annular fabric cover completely encloses the ring and forms a seat therein for the ball. Between the inner surface of the ring and the portion of the cover inside it a layer of plastic material is bonded to them. The struts also are covered with fabric. The annular cover flares outwardly around the struts to form a suturing cuff, and the portions of the metal ring between adjacent struts preferably are bowed axially of the ring in a direction away from the struts so that the ring and valve seat are scalloped.

The preferred embodiment of the invention is illustrated in the accompanying drawings, in which:

FIG. 7 is an exploded view of part of a modified embodiment of the invention;

FIG. 8 is an assembly with an additional part; and

FIG. 9 is an enlarged combination elevation and cross section, similar to FIG. 2, of the complete modified valve.

Figure 1:
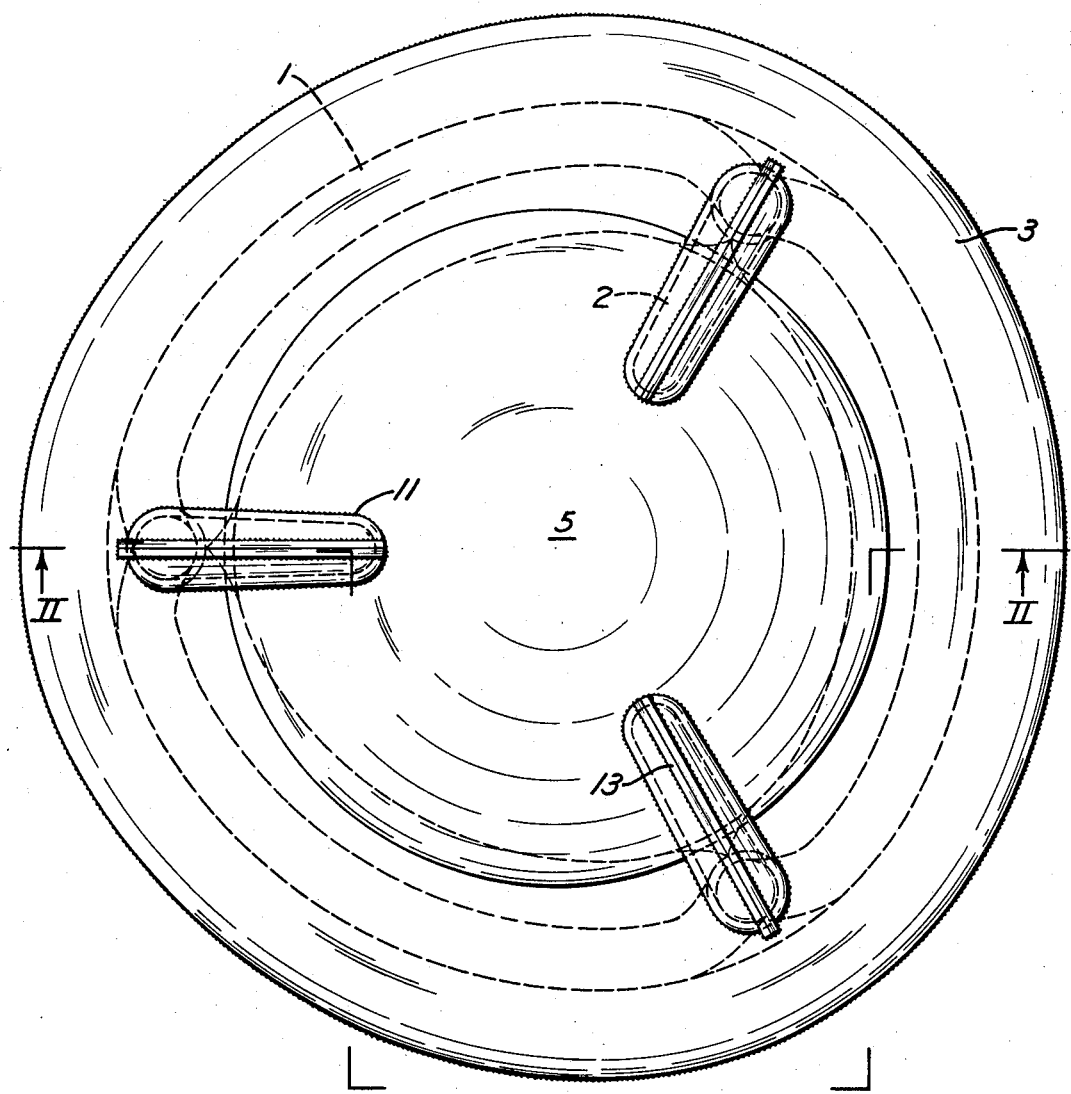
FIG. 1 is a view of the valve taken from the cage end.
Figure 2:
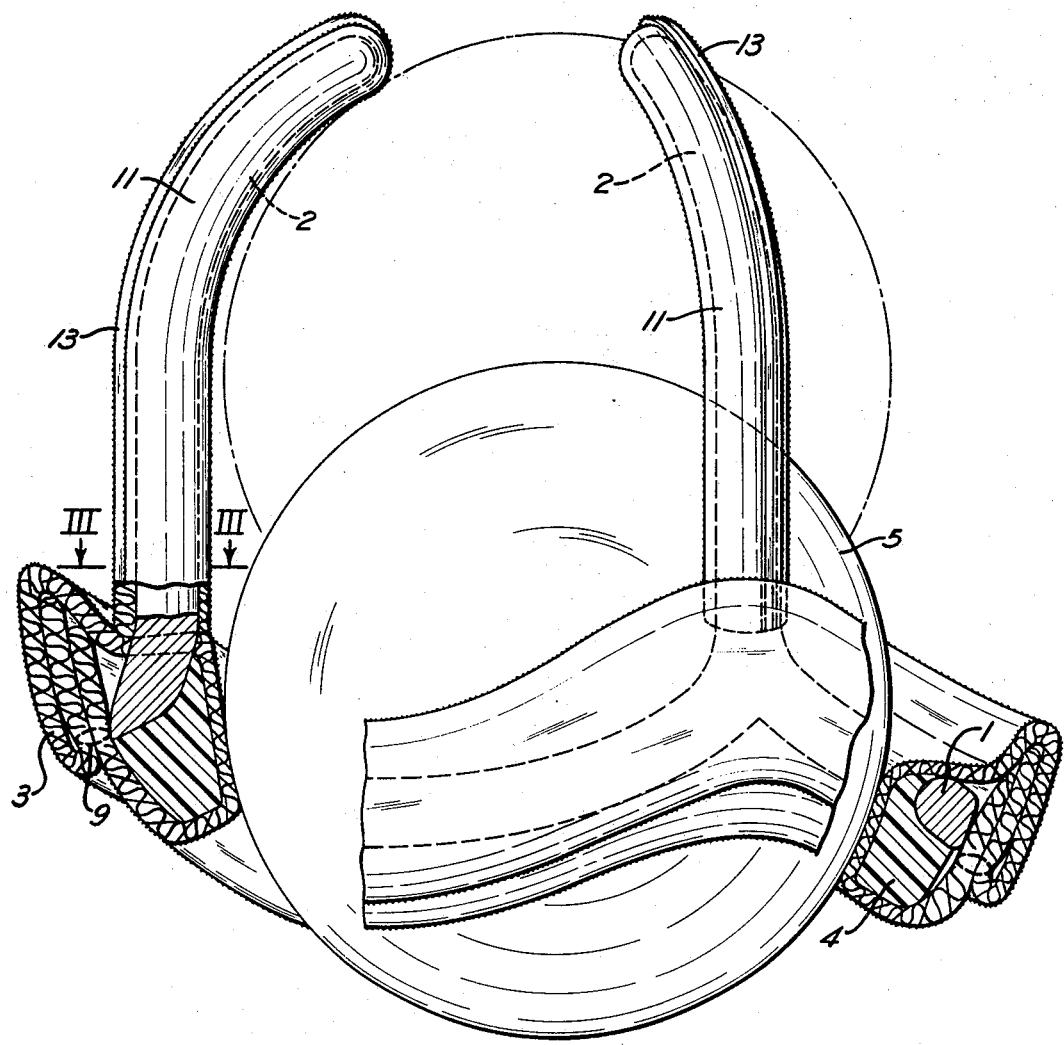
FIG. 2 is a combination elevation and cross section taken on the line II—II of FIG. 1.

Referring to FIGS. 1 and 2 of the drawings, a metal ring 1, preferably made of commercially pure titanium, with which blood does not react, has at least three struts 2 extending away from one end. The ring forms the body of the valve, and the opening in the ring forms a passage for flow of blood through the valve. The inner ends of the struts are integral with the ring at uniformly spaced points, and the outer ends of the struts are curved inwardly toward the axis of the ring so that a valve cage is formed. A fabric cover 3, preferably made of Dacron velour because its surface is formed of tiny fiber loops with which human tissue can interlock, completely encloses the ring and forms a valve seat within it facing the cage. A feature of this invention is that between the inner surface of the metal ring and the portion of cover 3 insde of the ring there is an annular layer 4 of plastic material that impregnates the fabric and bonds the cover to the ring. It also spaces the valve seat from the ring to cushion it. The plastic material may be a rubber or a synthetic resin, preferably a thermosetting plastic like polysulfone that can be steam autoclaved without injury.

Inside the cage is a valve ball 5. It has been discovered that a highly polished hollow titanium ball is especially suitable because it can be made very light in weight and is very stable dimensionally, unlike silicone balls. Of course, it will not wear or disintegrate with use. A titanium ball can have an extremely thin wall and still remain so rigid that it will seal a large valve opening without any danger of wedging in it. Also, due to the light weight of the ball, inertial delay in opening and closing the valve is avoided, so the effective size of the valve orifice is increased in size. There is no flutter or bouncing of the ball during opening and closing. The mirror finish that the ball has minimizes the already small likelihood of fibrin depositing on its surface. The plastic layer behind the valve seat prevents the ball from beating the fabric directly against the metal ring, and it also so impregnates the fabric that even if the ball wears the fabric the latter will not separate from itself or the ring. In other words, the plastic layer converts the metal ring and the portion of the fabric cover inside of it into an integral unit that has a cushioned valve seat.

Figure 4:
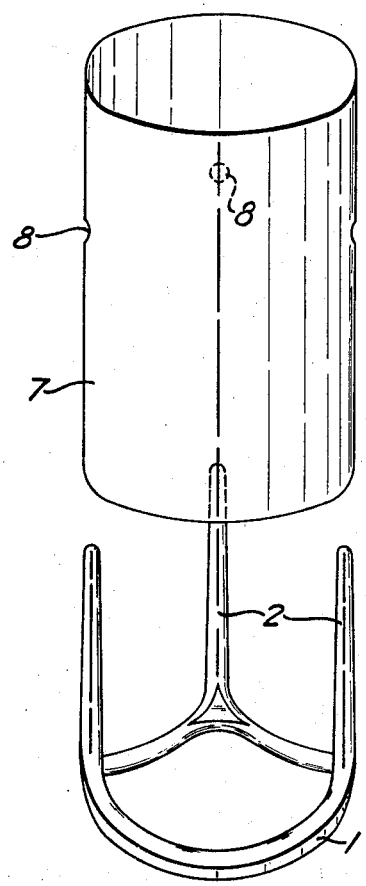
FIGS. 4, 5 and 6 are reduced perspective views of different steps in the process of making the valve.
Figure 5:
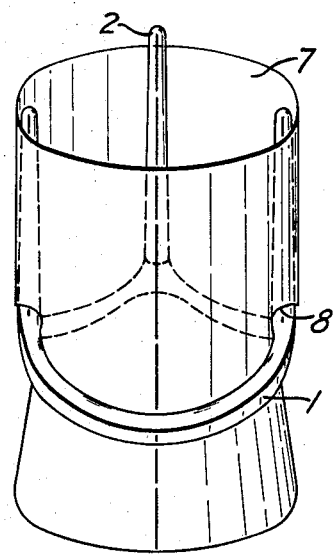
Figure 6:
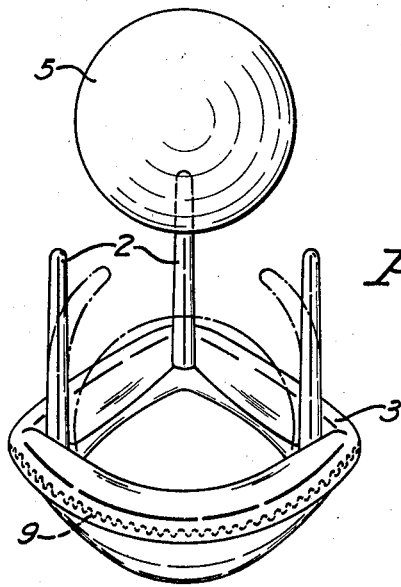

The fabric cover 3 can be formed by selecting a short length of tubular fabric 7 having a diameter about the same as the metal ring, as shown in FIG. 4. If the fabric has the desired velour surface, that is the inner surface of the tube. The tube is provided with holes 8 for the struts. It is pulled part way down through the ring, as shown in FIG. 5, with the struts extending up through the holes. These parts then are placed in a suitable mold and plastic is injected between the inside of the ring and the encircled area of the fabric tube to impregnate the fabric and form the layer 4 that bonds them together.

After the plastic has been cured and the unit removed from the mold, the fabric tube is trimmed to the desired length if it is too long, which it usually is. Then the upper end portion of the tube is turned out and down upon itself and the resulting double thickness is turned down and in around the lower end of the tube, which in the meantime has been turned out around the bottom of the ring and plastic layer and up around their outer surfaces as shown in FIG. 2. The turned back upper end of the tube and the upwardly extending lower end of the tube are fastened together all around the ring by means of a purse string stitch 9 that later is pulled up tight to hide the stitch. The folded end portions of fabric cover 2 outside of the ring project therefrom and form an upwardly flaring cuff around the bases of the struts. This cuff serves as a suturing ring, by which the valve can be secured in place in a human heart.

Figure 3:
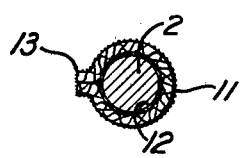
FIG. 3 is a cross section of one of the struts taken on the line III—III of FIG. 2.

As it is highly desirable to have no exposed stationary metal surfaces, over which tissue can grow and then break away to form a coronary occlusion, the struts are enclosed in fabric also. Accordingly, tiny sleeves 11 for the struts are made of the same material as the ring cover, but it is preferred to line the sleeves with plastic material 12 (FIG. 3) bonded to them to reduce wear by the valve ball and to prevent any fraying or separation of the fabric due to whatever wear may occur. The sleeves are permanently bonded to the struts by adhesive. A suitable way of making the sleeves is to place a mandrel on a tiny medical grade silicone rubber sheet laid on a fabric sheet and then mold the sheets around the mandrel under heat and pressure. This forms a fin along one side of the sleeve, most of which then is trimmed off. When the sleeve is slipped over a strut, the remainder of the fin 13 is located at the outside. This gives the sleeve's cross section a streamlined appearance, a shown in FIG. 3, with the fin end (the narrow end) of the section pointing away from the axis of the ring. These streamlined sleeves help to avoid turbulence in the blood stream as it leaves the passage through the valve.

A major feature of this invention is that the valve is of such shape that it has a blood passage which is large in relation to the outer diameter of the valve. This is accomplished by using a metal ring that does not lie in a single flat plane, but which is scalloped. That is, the portion of the ring between each adjacent pair of struts, in addition to being curved outwardly, is bowed away from the valve cage in a direction extending axially of the ring. With three struts, the ring has three of these downwardly bowed portions. Nevertheless, the ball fits against the valve seat all around the seat when the valve is closed. When the valve is fully open, the scalloped portions of the valve seat are farther from the ball than the seat would be if it were disposed in a plane perpendicular to the axis of the valve. This provides a larger opening for the blood flowing through the valve, without increasing the diameter of the valve. Another advantage of the scalloped ring is that it and the cuff conform to the shape of attachment of aortic valve leaflets at the base of the three sinuses of Valsalva and valve commissures, so the valve fits the heart opening better.

The modification shown in FIGS. 7, 8 and 9 is an improvement over the valve that has just been described. The modification has the advantage that it utilizes a valve cage that is lighter in weight than the one first described, and that is composed of struts or legs that are smaller in diameter. The smaller the diameter of the struts, the less turbulence they cause in the blood stream, and turbulence is highly undesirable.

The valve cage is made as a separate unit and then is attached to the valve ring. As shown in FIG. 7, the cage is formed from at least three metal struts or legs 15 that are rigidly joined together at their outer ends on the axis of the metal ring 16. The ring is scalloped like the one first described, and for the same purpose. The inner or free end of the struts are bent slightly to form hooks 17 that can receive and hook onto the inner surface of the ring in its circumferentially spaced uppermost areas. The natural tendency of the inner ends of the struts is to be spaced apart slightly farther than they are after they have been attached to the ring, so they are attached to it by merely springing them toward one another far enough to be inserted in the ring. When released, they spring out into engagement with the inner surface of the ring. Due to the fact that the outer ends of the struts are joined together so that both ends of each strut are anchored, the diameter of a strut can be made considerably less than in the first embodiment without weakening the strut.

Before the cage is inserted in the ring in the manner just described, a fabric sleeve 18 is slipped over each strut to cover it. The outer ends of the sleeves are fastened together where the struts join. Then the cage is inserted in a short length of tubular fabric 19, having a diameter about the same as the ring, until the free ends of the struts can project out through holes 20 in the tube about midway between its opposite ends. The fabric tube and the free ends of the struts now are ready for insertion in the metal ring to hook the cage onto the ring, as shown in FIG. 8. Following this, the valve ball 21, which may be a hollow titanium sphere, is inserted into the cage through the metal ring.

This assembly then is placed in a mold and a suitable plastic 23 (FIG. 9) such as that previously described, is injected around the metal ring and between the inside of it and the area of the fabric tube directly inside the ring. This plastic material impregnates the fabric and bonds it to the ring and cushions the valve seat. The plastic also serves the additional functions of embedding the ends of the struts and ring to permanently connect them together, and anchoring the inner ends of sleeves 18 that cover the cage struts.

The next step is to cure the plastic, after which the unit is removed from the mold and the ends of the fabric tube are trimmed to the proper length. The end portions of the tube then are folded out against the opposite ends of the ring, overlapped and sewed together by a purse stitch 24 in the same manner as the fabric cover on the valve first described herein. Likewise, the folded end portions of the fabric cover outside of the ring form an upwardly flaring cuff that serves as a suturing ring. The shape of the narrow valve seat is such that the ball will fit against it all around the seat when the valve is closed.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A prosthetic heart valve comprising a metal ring forming a blood passage, at least three struts connected to said ring and extending away from one end of it to form a cage, an annular fabric cover completely enclosing said ring and forming a valve seat therein facing the cage, a layer of plastic material between the inner surface of the metal ring and the portion of the cover inside of it, said layer bonding the cover to the ring and spacing said seat from the ring, and a ball loosely disposed in said cage and adapted to periodically engage said seat to close said blood passage intermittently.

2. A heart valve according to claim 1, in which said fabric cover is Dacron velour.

3. A heart valve according to claim 1, in which said plastic material is thermosetting polysulfone.

4. A heart valve according to claim 1, in which said cover flares outwardly around the struts close to said ring to form a suturing cuff.

5. A heart valve according to claim 1, in which the portions of said metal ring between adjacent struts are bowed axially of the ring in a direction away from the cage whereby the ring and valve seat are scalloped.

6. A heart valve according to claim 1, including a fabric sleeve covering each strut and secured thereto.

7. A heart valve according to claim 1, in which said cover is formed from a tubular length of fabric extending through the ring and having end portions extending outwardly across the opposite ends of the ring and into overlapping relationship with each other, and fastening means securing said overlapping portions of the fabric together, said cover being provided with holes for the struts.

8. A heart valve according to claim 1, in which said cover is formed from a tubular length of fabric extending through the ring and having end portions extending outwardly across the opposite ends of the ring, one of said end portions of fabric being provided with holes for the struts and extending outwardly therefrom with its end turned back upon itself and engaging the outer surface of the other end portion, and stitches fastening said turned back end and other end portions of the fabric together to form a suturing cuff around the metal ring.

9. A heart valve according to claim 1, in which said ball is a hollow titanium sphere.

10. A heart valve according to claim 1, in which the outer ends of said struts are rigidly joined together, and the inner ends of the struts are hooked onto the inner surface of the metal ring and embedded in said layer of plastic material.

11. A heart valve according to claim 10, including fabric sleeves covering the struts and embedded at one end in said layer of plastic material.

References Cited

UNITED STATES PATENTS 3,130,419    4/1964    Edwards _____ 3—1

(Other references on following page)

References Cited

UNITED STATES PATENTS

| | | | |
|---|---|---|---|
| 3,197,788 | 8/1965 | Segger | 3—1 |
| 3,263,239 | 8/1966 | Edwards et al. | 3—1 |
| 3,365,728 | 1/1968 | Edwards et al. | 3—1 |
| 3,466,671 | 9/1969 | Siposs | 3—1 |

OTHER REFERENCES

Prosthetic Replacement of the Mitral Valve, The Lancet, Nov. 24, 1962, p. 1087.

Evaluation of Two Prosthesis for Total Replacement of the Mitral Valve by F. S. Cross et al., The Journal of Thurais and Cardiovascular Surgery, vol. 46, December 1963, No. 6, pp. 719–725.

Simplified Insertion of Aortic Homograft Valves With Nonthrombogenic Prosthetic Frames by N. S. Braunwald et al., Trans. Amer. Soc. Artif. Int. Organs, vol. XIII, June 16, 1967.

RICHARD A. GAUDET, Primary Examiner

R. L. FRINKS, Assistant Examiner

U.S. Cl. X.R.

137—533.11